(12) United States Patent
Tabuchi

(10) Patent No.: US 9,810,247 B2
(45) Date of Patent: Nov. 7, 2017

(54) ROTARY ACTUATOR

(71) Applicant: SMC Corporation, Chiyoda-ku (JP)

(72) Inventor: Toshikazu Tabuchi, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 155 days.

(21) Appl. No.: 14/818,444

(22) Filed: Aug. 5, 2015

(65) Prior Publication Data

US 2016/0061231 A1    Mar. 3, 2016

(30) Foreign Application Priority Data

Sep. 2, 2014  (JP) .................................. 2014-177610

(51) Int. Cl.
| | | |
|---|---|---|
| *F15B 15/06* | (2006.01) | |
| *F16H 19/04* | (2006.01) | |
| *F15B 15/14* | (2006.01) | |

(52) U.S. Cl.
CPC .......... *F15B 15/065* (2013.01); *F16H 19/04* (2013.01); *F15B 15/149* (2013.01); *F15B 15/1433* (2013.01)

(58) Field of Classification Search
CPC ...... F16H 19/04; F15B 15/065; F15B 15/149; F15B 15/1433
USPC .................................................... 92/68, 136
See application file for complete search history.

(56) References Cited

U.S. PATENT DOCUMENTS

| | | |
|---|---|---|
| 6,640,689 B2 | 11/2003 | Mitsui et al. |
| 8,646,376 B2 | 2/2014 | Takeuchi et al. |
| 8,695,635 B1 | 4/2014 | Wang |
| 2003/0041598 A1 | 3/2003 | Takeuchi et al. |
| 2010/0018387 A1 | 1/2010 | Miyazawa |
| 2010/0064834 A1* | 3/2010 | Takeuchi .............. F15B 15/065 74/422 |
| 2011/0240649 A1* | 10/2011 | Hara ................... F15B 15/1438 220/324 |

FOREIGN PATENT DOCUMENTS

| | | |
|---|---|---|
| CN | 202065309 U | 12/2011 |
| JP | 62-41906 U | 3/1987 |
| JP | 2537200 Y2 * | 5/1997 |
| JP | 3701576 B2 | 9/2005 |

(Continued)

OTHER PUBLICATIONS

JP 2537200 Y2 machine translation to English. 1997.*

(Continued)

*Primary Examiner* — Edelmira Bosques
*Assistant Examiner* — Michael Quandt
(74) *Attorney, Agent, or Firm* — Oblon, McClelland, Maier & Neustadt, L.L.P.

(57) ABSTRACT

A rotary actuator is equipped with an end cover disposed on one end surface of a cylinder main body, a first plug that is engaged with a wall surface constituting an opening on another end side of a first cylinder hole, and a second plug that is engaged with a wall surface constituting an opening on another end side of a second cylinder hole. A first port communicating with a first front cylinder chamber and a second rear cylinder chamber, and a second port communicating with a second front cylinder chamber and a first rear cylinder chamber are formed in the end cover.

4 Claims, 8 Drawing Sheets

(56) References Cited

FOREIGN PATENT DOCUMENTS

| JP | 3815856 B2 * | 8/2006 | ............ F15B 15/065 |
|----|----|----|----|
| JP | 2008-157289 | 7/2008 | |
| JP | 2010-71390 A | 4/2010 | |
| KR | 10-1134398 B1 | 4/2012 | |

OTHER PUBLICATIONS

JP 3815856 B2 machine translation to English. 2006.*
Korean Office Action dated Nov. 16, 2016 in Patent Application No. 10-2015-0124085 (with Partial English Translation).
Combined Taiwanese Office Action and Search Report dated Jun. 2, 2016 in Patent Application No. 104126688 (with partial English language translation).
Office Action dated Mar. 14, 2017 in Japanese Patent Application No. 2014-177610 (with partial English translation).

* cited by examiner

ROTARY ACTUATOR

CROSS-REFERENCE TO RELATED APPLICATION

This application is based upon and claims the benefit of priority from Japanese Patent Application No. 2014-177610 filed on Sep. 2, 2014, the contents of which are incorporated herein by reference.

BACKGROUND OF THE INVENTION

Field of the Invention

The present invention relates to a rack and pinion type of rotary actuator that causes a rotary shaft to be rotated by reciprocating motions of a first piston and a second piston.

Description of the Related Art

A rack and pinion type of rotary actuator, for example, is equipped with a cylinder main body through which a first cylinder hole and a second cylinder hole that extend mutually in parallel are formed to penetrate. A first piston is arranged for displacement along an axial direction in the first cylinder hole, and a second piston is arranged for displacement along an axial direction in the second cylinder hole. A first rack is provided on the first piston and a second rack is provided on the second piston. In a state of facing one another mutually, the first rack and the second rack are enmeshed with a pinion, which is provided on a rotary shaft.

Further, end covers are disposed on opposite end surfaces of the cylinder main body. A first port and a second port through which a working fluid flows are formed in one of the end covers. In addition, by an action of the working fluid, the first piston and the second piston are displaced in opposite directions to each other, whereby a table, which is provided on the rotary shaft, can be made to rotate (for example, see Japanese Laid-Open Patent Publication No. 2008-157289).

SUMMARY OF THE INVENTION

With the conventional technology as disclosed in the aforementioned Japanese Laid-Open Patent Publication No. 2008-157289, since end covers are provided on both end surfaces of the cylinder main body, the total length of the rotary actuator becomes comparatively large.

The present invention has been devised taking into consideration the aforementioned problem, and has the object of providing a rotary actuator that can be reduced in size.

A rotary actuator according to the present invention includes a cylinder main body through which a first cylinder hole and a second cylinder hole that extend mutually in parallel are formed to penetrate, a first piston arranged for displacement in the first cylinder hole along an axial direction of the first cylinder hole and on which a first rack is provided, a second piston arranged for displacement in the second cylinder hole along an axial direction of the second cylinder hole and on which a second rack is provided, and a rotary shaft on which there is provided a pinion that meshes with the first rack and the second rack. The rotary actuator further includes an end cover which, in a state of being disposed on one end surface of the cylinder main body, forms a first cylinder chamber between the end cover and the first piston by closing an opening on one end side of the first cylinder hole, and forms a second cylinder chamber between the end cover and the second piston by closing an opening on one end side of the second cylinder hole, a first plug engaged with a wall surface that constitutes an opening on another end side of the first cylinder hole, and forming a third cylinder chamber between the first plug and the first piston, and a second plug engaged with a wall surface that constitutes an opening on another end side of the second cylinder hole, and forming a fourth cylinder chamber between the second plug and the second piston. In the cylinder main body, there are formed a first communication passage that communicates with the third cylinder chamber, and a second communication passage that communicates with the fourth cylinder chamber. Further, in the end cover, there are formed a first port, which communicates with the first cylinder chamber and the second communication passage, and through which a working fluid flows, and a second port, which communicates with the second cylinder chamber and the first communication passage, and through which the working fluid flows.

According to the rotary actuator of the present invention, the first plug engages with a wall surface constituting an opening on another end side of the first cylinder hole, and the second plug engages with a wall surface constituting an opening on another end side of the second cylinder hole. Consequently, compared to a structure in which end covers are provided on opposite end surfaces of the cylinder main body, the total length of the rotary actuator can be made shorter, and therefore, a smaller scale rotary actuator can be provided.

In the aforementioned rotary actuator, the first plug may be positioned in the first cylinder hole without projecting outside of the first cylinder hole, and the second plug may be positioned in the second cylinder hole without projecting outside of the second cylinder hole. In accordance with such a structure, the rotary actuator can be made even smaller in scale.

In the aforementioned rotary actuator, the first plug may be engaged by an outer edge portion of the first plug biting into the wall surface that constitutes the opening on the other end side of the first cylinder hole, and the second plug may be engaged by an outer edge portion of the second plug biting into the wall surface that constitutes the opening on the other end side of the second cylinder hole.

In accordance with this structure, the first plug and the second plug can be fixed reliably with respect to the cylinder main body with no need to use fastening members such as bolts or the like. Further, since a seal member such as a gasket or the like is unnecessary, the number of parts can effectively be reduced.

In the aforementioned rotary actuator, and in particular in the end cover thereof, there may be formed a first communication recess that communicates with the first port and is arranged face-to-face with the opening on the one end side of the first cylinder hole, a second communication recess that communicates with the second port and is arranged face-to-face with the opening on the one end side of the second cylinder hole, a third communication recess arranged face-to-face with an opening of the first communication passage that opens on the one end surface of the cylinder main body, a fourth communication recess arranged face-to-face with an opening of the second communication passage that opens on the one end surface of the cylinder main body, a first connecting passage that communicates with the first communication recess and the fourth communication recess, and a second connecting passage that communicates with the second communication recess and the third communication recess.

According to such a structure, with a simple configuration, the first port can be made to communicate with the first cylinder chamber and the fourth cylinder chamber, and the second port can be made to communicate with the second cylinder chamber and the third cylinder chamber.

In the aforementioned rotary actuator, the first connecting passage may be formed in the interior of the end cover, and the second connecting passage may be a recess that is formed on an outer surface of the end cover that faces the cylinder main body. In accordance with this structure, with a simple configuration, the first connecting passage and the second connecting passage can be formed in the end cover without interfering with one another.

In the aforementioned rotary actuator, a gasket, which is formed integrally along a contour of the first port, the second port, the first communication recess, the second communication recess, the third communication recess, the fourth communication recess, and the second connecting passage, is interposed between the end cover and the cylinder main body. By this feature, a reliable seal can be formed between the end cover and the cylinder main body.

According to the present invention, since the first plug engages with a wall surface constituting an opening on another end side of the first cylinder hole, and the second plug engages with a wall surface constituting an opening on another end side of the second cylinder hole, the rotary actuator can be made smaller in scale.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
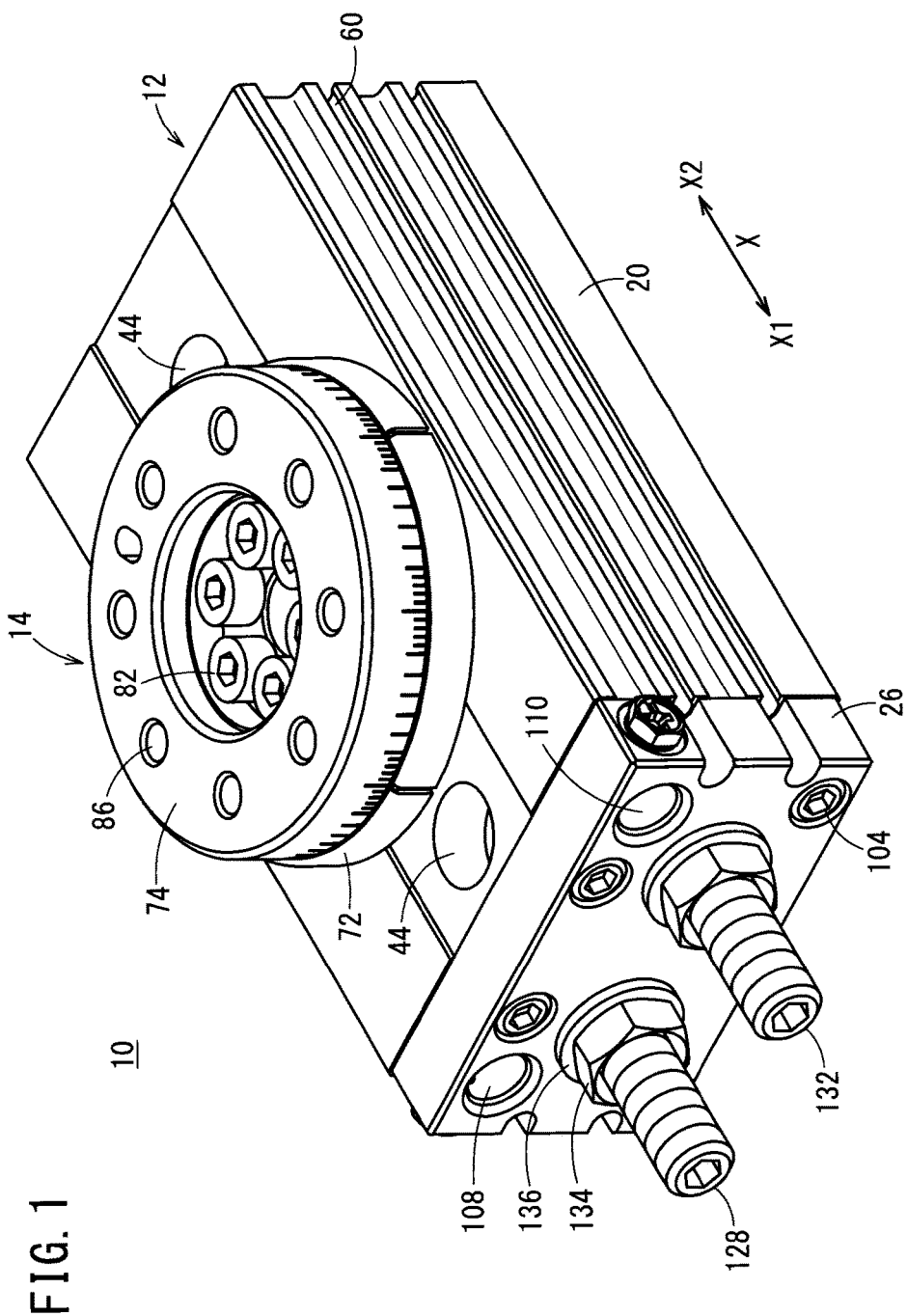
FIG. 1 is a perspective view of a rotary actuator according to an embodiment of the present invention.

Below, a preferred embodiment of a rotary actuator according to the present invention will be described with reference to the accompanying drawings.

As shown in FIGS. 1 through 5, the rotary actuator 10 according to the embodiment of the present invention is a so-called rack and pinion type of rotary actuator, which is equipped with a cylinder section 12 having a first rack 54 and a second rack 62, and a table section 14 having a pinion 64. In the description given below, to facilitate explanation, in relation to the rotary actuator 10 and the constituent elements thereof, the arrow X1 shown in FIGS. 1 to 4 is referred to as a "front direction", whereas the arrow X2 shown in FIGS. 1 to 4 is referred to as a "rear direction".

The cylinder section 12 is equipped with a cylinder main body 20, which is formed with a substantially rectangular parallelepiped, and in which a first cylinder hole 16 and a second cylinder hole 18 are formed to penetrate through the cylinder main body 20 mutually in parallel along the longitudinal direction (the direction of the arrow X), a first piston 22 arranged in the first cylinder hole 16, a second piston 24 arranged in the second cylinder hole 18, an end cover 26 that closes openings on one end side (in the direction of the arrow X1) of the first cylinder hole 16 and the second cylinder hole 18, a first plug 28 that closes an opening on the other end side (in the direction of the arrow X2) of the first cylinder hole 16, and a second plug 30 that closes an opening on the other end side of the second cylinder hole 18.

More specifically, the cylinder section 12 includes a first front cylinder chamber (first cylinder chamber) 32 formed between the end cover 26 and the first piston 22, a first rear cylinder chamber (third cylinder chamber) 34 formed between the first piston 22 and the first plug 28, a second front cylinder chamber (second cylinder chamber) 36 formed between the end cover 26 and the second piston 24, and a second rear cylinder chamber (fourth cylinder chamber) 38 formed between the second piston 24 and the second plug 30.

Figure 2:
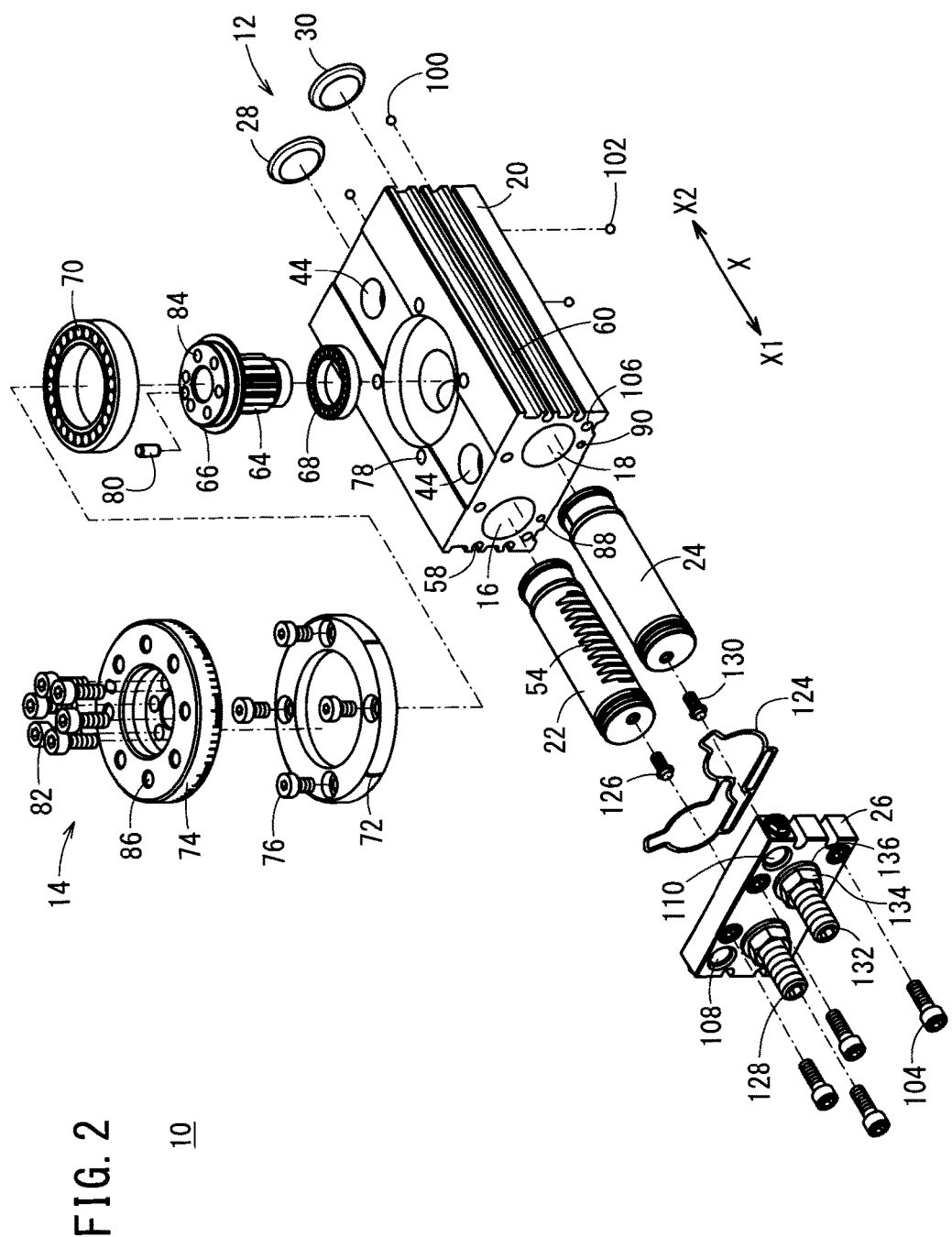
FIG. 2 is an exploded perspective view of the rotary actuator shown in FIG. 1.

The cylinder main body 20 is constituted from a metal such as aluminum or an aluminum alloy or the like. Within the cylinder main body 20, in a wall 40 that is provided between the first cylinder hole 16 and the second cylinder hole 18, an installation hole 42 is formed in which the table section 14 is disposed, and a plurality of mounting holes 44 (two mounting holes as shown in FIG. 2) are formed for fixing the cylinder main body 20 in a predetermined position. As can be understood from FIG. 3, the installation hole 42 communicates with the first cylinder hole 16 and the second cylinder hole 18, in a state of penetrating in the height direction through the cylinder main body 20.

A pair of piston packings 46, 48, and a pair of wear rings 50, 52 are mounted through annular recesses on the outer circumferential surface of the first piston 22. The piston packing 46 on one end side of the first piston 22 is positioned more in the direction of the arrow X1 than the wear ring 50, and the piston packing 48 on the other end side of the first piston 22 is positioned more in the direction of the arrow X2 than the wear ring 52. However, the piston packing 46 on one end side of the first piston 22 may be positioned more in the direction of the arrow X2 than the wear ring 50, and the piston packing 48 on the other end side of the first piston 22 may be positioned more in the direction of the arrow X1 than the wear ring 52.

Between the pair of wear rings 50, 52 on the outer circumferential surface of the first piston 22, a first rack 54 that meshes with the pinion 64 is formed. A position detecting magnet 56 is installed through an annular recess on the first piston 22 between the piston packing 48 and the wear ring 52. Magnetism from the magnet 56 is detected by non-illustrated magnetic detection sensors, which are mounted in sensor attachment grooves 58, 60 formed on both side surfaces of the cylinder main body 20. Consequently, the position of the first piston 22 with respect to the cylinder main body 20, or stated otherwise, the angle of rotation of the pinion 64 can be obtained.

Since the second piston 24 is constructed substantially in the same manner as the first piston 22, detailed description thereof is omitted. Further, the second rack 62 of the second piston 24 meshes with the pinion 64 in a state of being face-to-face with the first rack 54.

Before describing the remaining structures of the cylinder section 12, the table section 14 will first be described. The table section 14 includes a hollow rotary shaft 66 having the pinion 64 that is enmeshed with the first rack 54 and the second rack 62, a pair of bearings 68, 70, which pivotally support the rotary shaft 66 and are disposed on a wall surface that makes up the installation hole 42, a ring body 72 that retains the bearing 70, and a table main body 74 disposed on the rotary shaft 66.

The bearing 68 pivotally supports a small diameter end on the bottom portion side of the rotary shaft 66, and the bearing 70 pivotally supports the table main body 74 and a large diameter end on a side opposite from the bottom portion of the rotary shaft 66. In the present embodiment, although the respective bearings 68, 70 are roller bearings, the invention is not limited to this feature.

A portion of the bearing 70 is arranged to project to the outside from the installation hole 42. The ring body 72 is fixed to the cylinder main body 20 by fastening and tightening a plurality of bolts 76 (four as shown in FIG. 2) into screw holes 78, which are formed on an outer surface of the cylinder main body 20, in a state in which the outer ring of the bearing 70 is pressed into the cylinder main body 20.

The table main body 74 is formed in an annular shape, and is fixed to the rotary shaft 66 by fastening and tightening a plurality of bolts 82 (six as shown in FIG. 2) into screw holes 84, which are formed on an end surface of the rotary shaft 66, in a state in which the table main body 74 is positioned around the axis of the rotary shaft 66 by a parallel pin 80. As a result, the table main body 74 can be rotated (is rotatable in a certain angular range) integrally together with the rotary shaft 66. Further, multiple attachment holes 86 for enabling attachment of a non-illustrated workpiece or jig, etc. to the table main body 74, are formed in the table main body 74.

In the cylinder main body 20, there are formed a first communication passage 88 that opens in one end surface of the cylinder main body 20 and communicates with the first rear cylinder chamber 34, and a second communication passage 90 that opens in the one end surface thereof and communicates with the second rear cylinder chamber 38.

Figure 6:
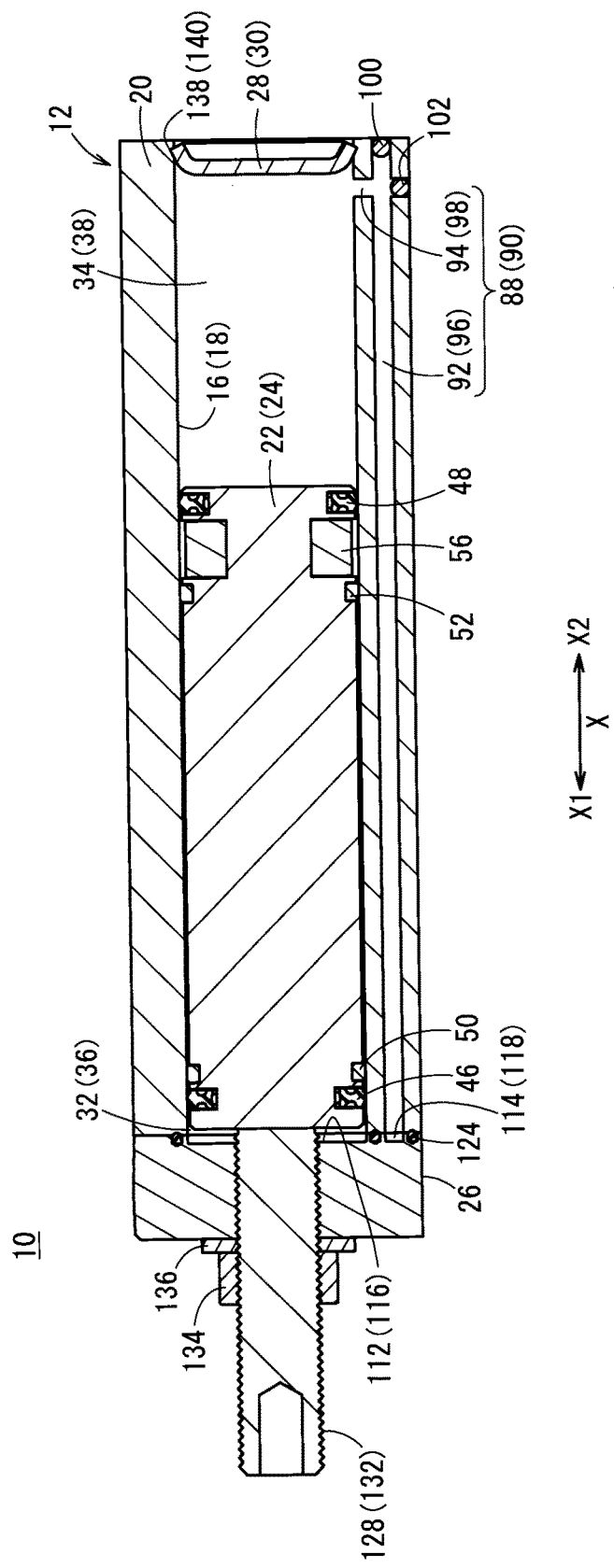
FIG. 6 is a cross-sectional view taken along line VI-VI of FIG. 3.
Figure 7:
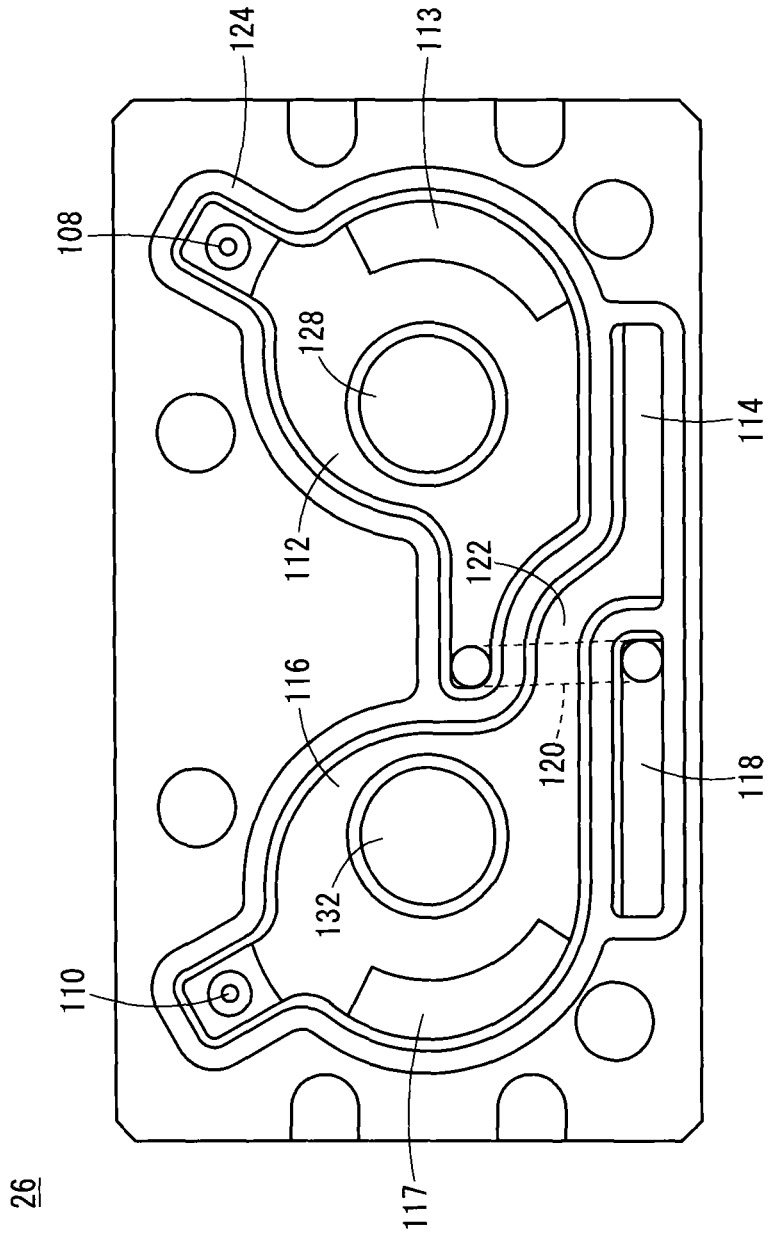
FIG. 7 is a rear view of an end cover.

As shown in FIG. 6, the first communication passage 88 includes a first through hole 92 that penetrates in a longitudinal direction more on a bottom surface side than the first cylinder hole 16 in the cylinder main body 20 (i.e., at a position across the first cylinder hole 16 from the table main body 74), and a first connecting hole 94 that opens in the bottom surface of the cylinder main body 20 and communicates with the first rear cylinder chamber 34 through the first through hole 92. The second communication passage 90 includes a second through hole 96 that penetrates in a longitudinal direction more on a bottom surface side than the second cylinder hole 18 in the cylinder main body 20, and a second connecting hole 98 that opens in the bottom surface of the cylinder main body 20 and communicates with the second rear cylinder chamber 38 through the second through hole 96.

Sealing members 100 are disposed in openings on the other end sides of the first through hole 92 and the second through hole 96, and sealing members 102 are disposed in openings on the bottom surface sides of the first connecting hole 94 and the second connecting hole 98. The respective sealing members 100, 102 are formed by steel balls, for example.

The end cover 26 is formed in a plate-shape by die casting, for example, and the end cover 26 is fixed to the cylinder main body 20 by fastening and tightening a plurality of bolts 104 (four as shown in FIG. 1) into screw holes 106, which are formed in the one end surface of the cylinder main body 20. A first port 108, which communicates with the first front cylinder chamber 32 and the second communication passage 90 (second rear cylinder chamber 38) and through which a working fluid flows, and a second port 110, which communicates with the second front cylinder chamber 36 and the first communication passage 88 (first rear cylinder chamber 34) and through which the working fluid flows, are formed in the end cover 26. Non-illustrated fluid passages for carrying out supply and discharge of the working fluid are connected to the first port 108 and the second port 110.

As shown in FIGS. 3, 4, 6 and 7, on the rear surface of the end cover 26 (the outer surface of the end cover 26 that faces the cylinder main body 20), there are formed a first front communication recess (first communication recess) 112 arranged face-to-face with the opening on the one end side of the first cylinder hole 16, a first rear communication recess (third communication recess) 114 arranged face-to-face with the opening on the one end side of the first through hole 92, a second front communication recess (second communication recess) 116 arranged face-to-face with the opening on the one end side of the second cylinder hole 18, and a second rear communication recess (fourth communication recess) 118 arranged face-to-face with the opening on the one end side of the second through hole 96. A thin-walled portion 113 is formed on the bottom surface that makes up the first front communication recess 112, and a thin-walled portion 117 is formed on the bottom surface that makes up the second front communication recess 116. Consequently, it is possible to reduce the weight of the end cover 26.

The first front communication recess 112 and the second rear communication recess 118 communicate with each other through a connecting passage (first connecting passage) 120 that is formed in the interior of the end cover 26. Further, the first rear communication recess 114 and the second front communication recess 116 communicate with each other through a connecting recess (second connecting passage) 122 that is formed in the rear surface of the end cover 26. Stated otherwise, the first rear communication recess 114, the second front communication recess 116, and the connecting recess 122 are connected with one another to thereby form one recess portion. In accordance therewith, with a simple configuration, the connecting passage 120 and the connecting recess 122 can be formed in the end cover 26 without interfering with one another.

Further, a gasket 124, which is provided integrally along the contour (outer shape) of the first port 108, the second port 110, the first front communication recess 112, the first rear communication recess 114, the second front communication recess 116, the second rear communication recess 118, and the connecting recess 122, is interposed between the end cover 26 and the cylinder main body 20. By this feature, leakage of the working fluid from between the end cover 26 and the cylinder main body 20 can suitably be prevented.

A first adjustment bolt 128, which comes into contact with a shock absorbing member 126 provided on one end surface of the first piston 22, and a second adjustment bolt 132, which comes into contact with a shock absorbing member 130 provided on one end surface of the second piston 24, are fixed by nuts 134 with respect to the end cover 26. More specifically, by adjusting the insertion amount of the first adjustment bolt 128 into the first front cylinder chamber 32 and the insertion amount of the second adjustment bolt 132 into the second front cylinder chamber 36, the stroke length of the first piston 22 and the second piston 24 (the angle of rotation of the table main body 74) can be set.

The respective shock absorbing members 126, 130 are constituted from an elastic material such as rubber or the like. The first adjustment bolt 128 is arranged so as to penetrate through the bottom surface of the first front communication recess 112, and the second adjustment bolt 132 is arranged so as to penetrate through the bottom surface of the second front communication recess 116. Sealing washers 136, which serve to prevent leakage of the working fluid from between the end cover 26 and the adjustment bolts 128, 132, are interposed between the respective nuts 134 and the end cover 26.

The first plug 28 is constituted from, for example, a metal such as aluminum or an aluminum alloy or the like, and is formed into a disk shape. The first plug 28 is engaged with a wall surface that makes up the opening on the other end side of the first cylinder hole 16. Stated otherwise, the first plug 28 engages with a wall surface constituting the first cylinder hole 16, and serves to close or block the opening on the other end side of the first cylinder hole 16. More specifically, an outer edge portion of the first plug 28 is curved so as to be inclined gradually in a radial outward direction, i.e., inclined toward a side at which the other end surface of the cylinder main body 20 is positioned (in the direction of the arrow X2), and a corner (edge part) 138 of the outer edge portion bites into the wall surface that constitutes the first cylinder hole 16.

In other words, the first plug 28 has a shape such that a central portion thereof projects toward the end cover 26 (in the direction of the arrow X1) with respect to the outer edge portion thereof. The first plug 28 is positioned in the interior of the first cylinder hole 16 without projecting outside of the first cylinder hole 16. Since the second plug 30 is constructed substantially in the same manner as the first plug 28, detailed description thereof is omitted. That is, the second plug 30 is engaged with the cylinder main body 20 by a corner 140 of the outer edge portion thereof biting into the wall surface that constitutes the opening of the other end side of the second cylinder hole 18.

Next, a method for installing the first plug 28 and the second plug 30 in the cylinder main body 20 will be explained. In a state prior to installation of the first plug 28 in the cylinder main body 20, the outer edge portion thereof is bent so as to be inclined gradually to one side in a radial outward direction.

Figure 8A:
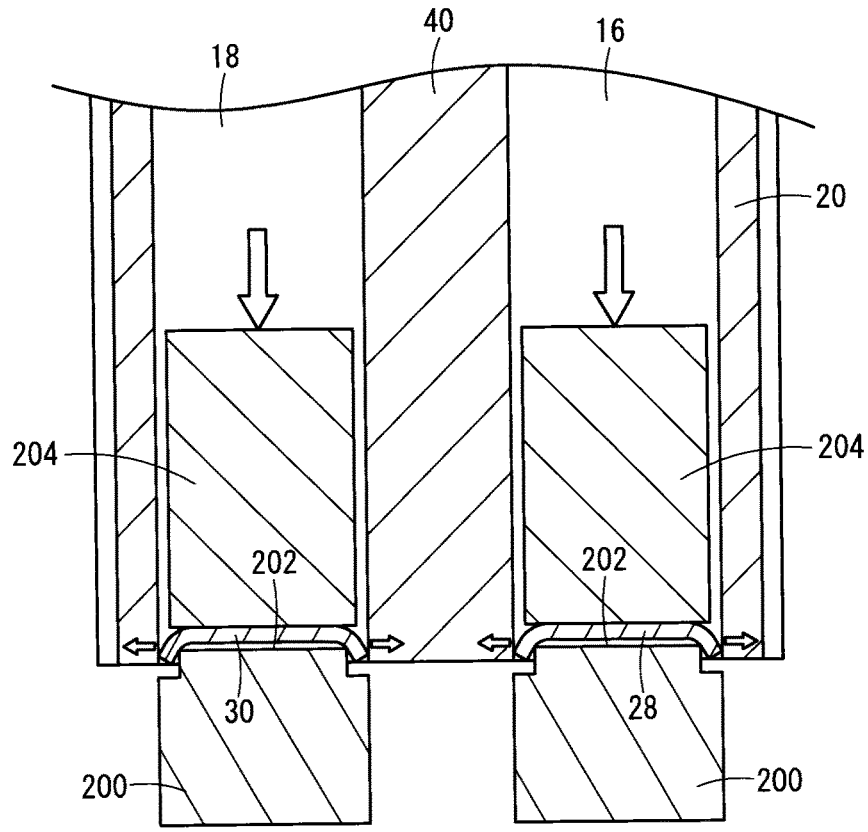
FIG. 8A is a cross-sectional view for describing a method by which a first plug and a second plug are mounted with respect to a cylinder main body.

At first, as shown in FIG. 8A, with the concave surface of the first plug 28 being oriented toward the side of a pedestal 200, the first plug 28 is inserted into the opening on the other end side of the first cylinder hole 16, in a state such that the curved outer edge portion of the first plug 28 is placed in contact with an angled outer edge portion of a circular pressure receiving surface 202 of the pedestal 200. At this time, a central portion of the concave surface of the first plug 28 is kept out of contact with the circular pressure receiving surface 202 of the pedestal 200. Further, the outer edge portion of the first plug 28 is in contact with or in close proximity to the wall surface that constitutes the opening of the other end side of the first cylinder hole 16.

Figure 8B:
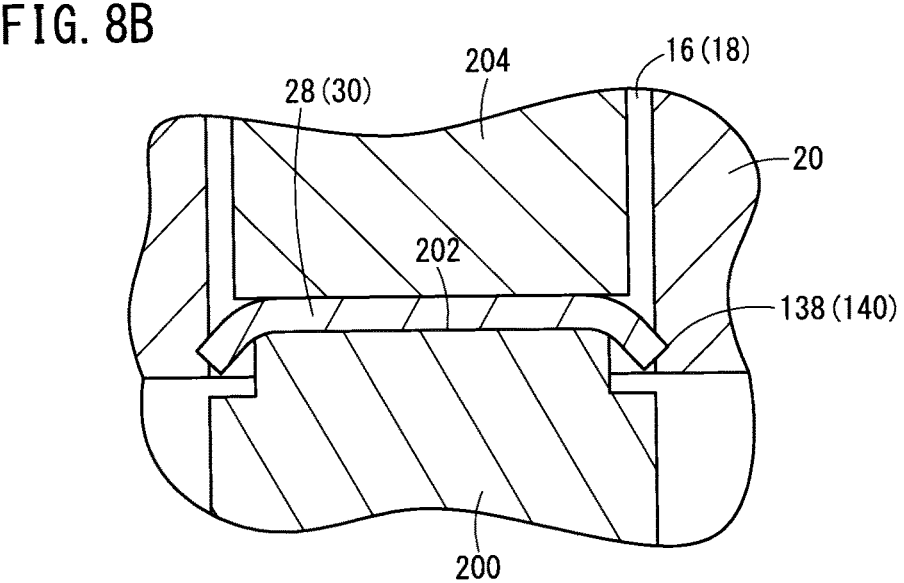
FIG. 8B is an enlarged cross sectional view showing a condition in which the first plug and the second plug are mounted in the cylinder main body.

In addition, a cylindrical pressing jig 204 is inserted from the opening on the one end side of the first cylinder hole 16, and in a state after the relative positioning between the cylinder main body 20 and the pedestal 200 has been fixed, the pressing jig 204 presses a central portion of the convex surface of the first plug 28. When this is done, the central portion of the concave surface of the first plug 28 is pressed against the circular pressure receiving surface 202 of the pedestal 200, whereupon the outer edge portion is plastically deformed so as to be expanded radially outward. In addition, by a corner 138 of the outer edge portion of the first plug 28 biting into the wall surface that constitutes the opening on the other end side of the first cylinder hole 16, the first plug 28 is fixed firmly and without gaps with respect to the cylinder main body 20 (see FIG. 8B). Consequently, a seal is formed between the first plug 28 and the cylinder main body 20. Since the installation method for the second plug 30 on the wall surface that constitutes the other end side of the second cylinder hole 18 is the same as the above-described installation method for the first plug 28, detailed description thereof is omitted.

The rotary actuator 10 according to the present embodiment is constructed basically as described above. Next, operations and effects of the rotary actuator 10 will be described. The condition shown in FIG. 3, in which the first piston 22 is positioned on an end in the direction of the arrow X1 of the first cylinder hole 16, and the second piston 24 is positioned on an end in the direction of the arrow X2 of the second cylinder hole 18, will be referred to as an initial position.

In the initial position, when a working fluid is supplied to the first port 108 in a state in which the second port 110 is open to atmosphere, the working fluid that is introduced to the first port 108 is guided into the first front cylinder chamber 32 through the first front communication recess 112, and is guided into the second rear cylinder chamber 38 through the first front communication recess 112, the connecting passage 120, the second rear communication recess 118, and the second communication passage 90.

Upon doing so, the first piston 22 is displaced in the direction of the arrow X2 by the working fluid that has been introduced into the first front cylinder chamber 32, and the second piston 24 is displaced in the direction of the arrow X1 by the working fluid that has been introduced into the second rear cylinder chamber 38.

At this time, fluid that exists in the first rear cylinder chamber 34 is discharged to atmosphere from the second port 110 through the first communication passage 88, the first rear communication recess 114, the connecting recess 122, and the second front communication recess 116, whereas fluid that exists in the second front cylinder chamber 36 is discharged to atmosphere from the second port 110 through the second front communication recess 116.

Figure 3:
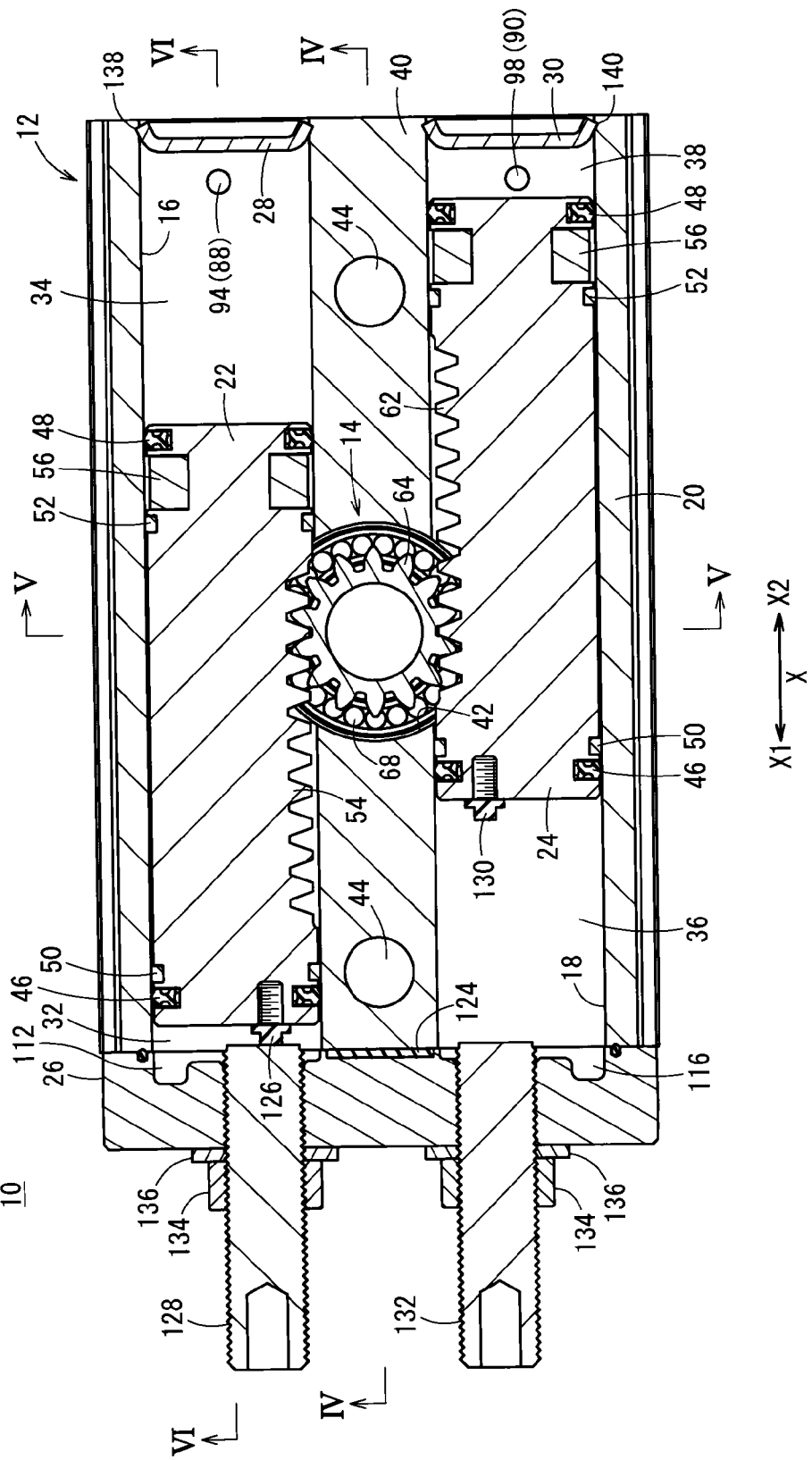
FIG. 3 is a transverse cross-sectional view of the rotary actuator shown in FIG. 1.
Figure 4:
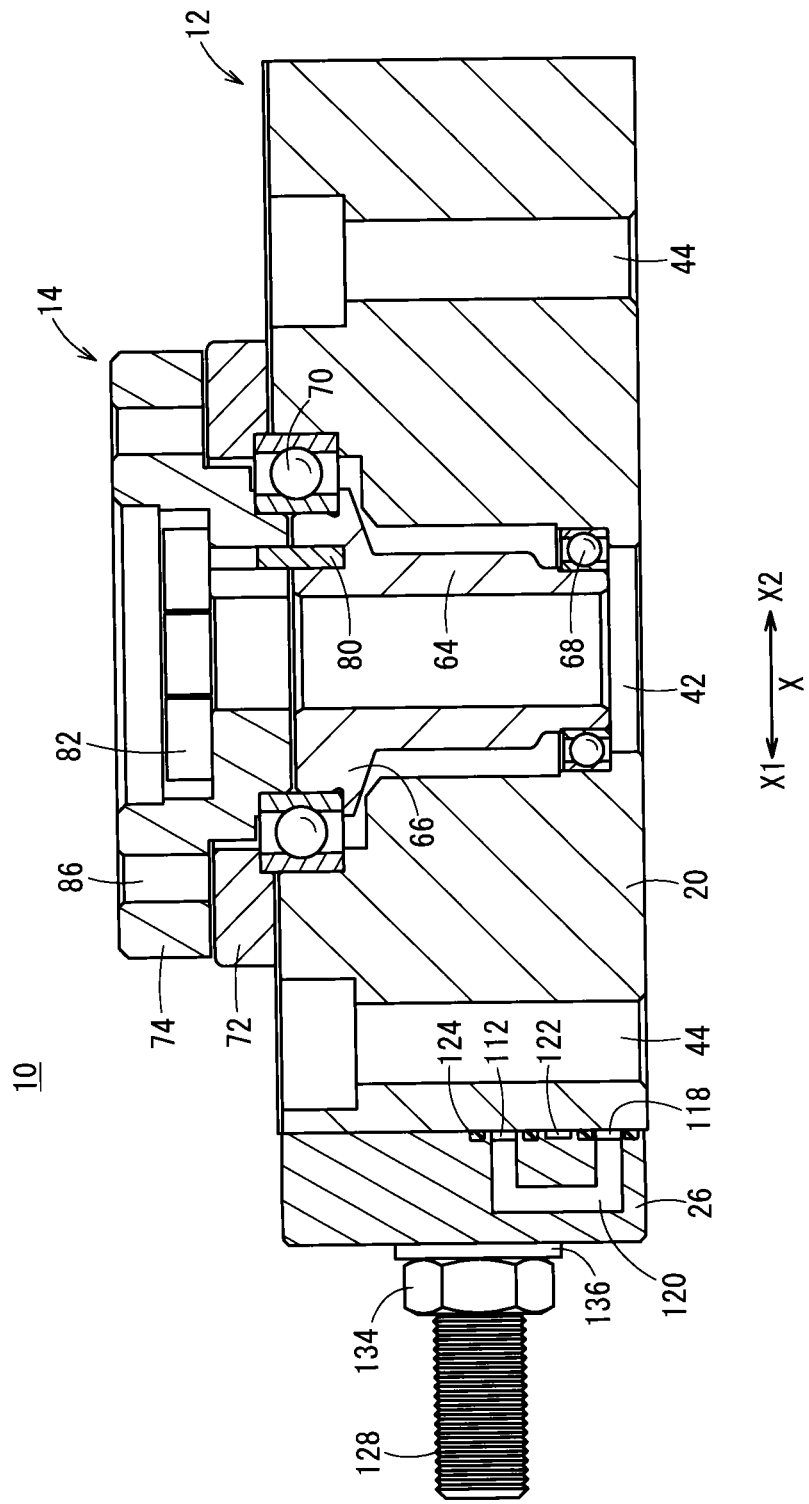
FIG. 4 is a cross-sectional view taken along line IV-IV of FIG. 3.
Figure 5:
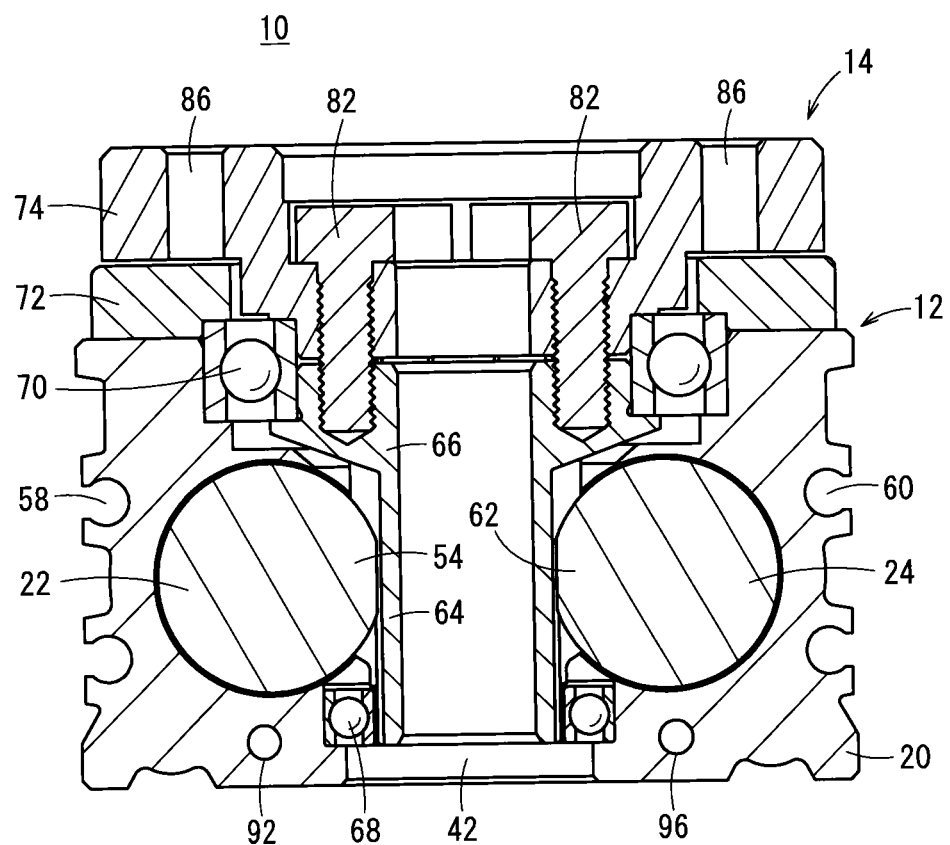
FIG. 5 is a cross-sectional view taken along line V-V of FIG. 3.

Consequently, the table main body 74 and the rotary shaft 66, which is equipped with the pinion 64 that meshes with the first rack 54 of the first piston 22 and the second rack 62 of the second piston 24, are rotated integrally in a clockwise direction as shown in FIG. 3.

In addition, by the shock absorbing member 130 that is provided on the one end surface of the second piston 24 contacting the second adjustment bolt 132 and thereby being subjected to elastic deformation, in a state in which shocks are buffered, the one end surface of the second piston 24 contacts the end surface of the second adjustment bolt 132, and displacement of the second piston 24 is stopped. In this condition, since rotation of the pinion 64 that meshes with the second rack 62 of the second piston 24 is locked, displacement of the first piston 22 including the first rack 54 that meshes with the pinion 64 also is stopped. More specifically, the rotary shaft 66 and the table main body 74 are rotated at a predetermined angle from the initial position and thereafter the rotation thereof is stopped.

Next, when a working fluid is supplied to the second port 110 in a state in which the first port 108 is open to atmosphere, the working fluid that is introduced to the second port 110 is guided into the second front cylinder chamber 36 through the second front communication recess 116, and is guided into the first rear cylinder chamber 34 through the second front communication recess 116, the connecting recess 122, the first rear communication recess 114, and the first communication passage 88.

Upon doing so, the first piston 22 is displaced in the direction of the arrow X1 by the working fluid that has been introduced into the first rear cylinder chamber 34, and the second piston 24 is displaced in the direction of the arrow X2 by the working fluid that has been introduced into the second front cylinder chamber 36.

At this time, fluid that exists in the first front cylinder chamber 32 is discharged to atmosphere from the first port 108 through the first front communication recess 112, whereas fluid that exists in the second rear cylinder chamber 38 is discharged to atmosphere from the first port 108 through the second communication passage 90, the second rear communication recess 118, the connecting passage 120, and the first front communication recess 112.

Consequently, the table main body 74 and the rotary shaft 66 are rotated integrally in a counterclockwise direction as shown in FIG. 3. In addition, by the shock absorbing member 126 that is provided on the one end surface of the first piston 22 contacting the first adjustment bolt 128 and thereby being subjected to elastic deformation, in a state in which shocks are buffered, when the one end surface of the first piston 22 contacts the end surface of the first adjustment bolt 128, displacement of the first piston 22 and the second piston 24 is stopped (the first piston 22 and the second piston 24 are restored to their initial positions), and rotation of the rotary shaft 66 and the table main body 74 also is stopped.

According to the present embodiment, the first plug 28 engages with the wall surface constituting the opening of the other end side of the first cylinder hole 16, and the second plug 30 engages with the wall surface constituting the opening of the other end side of the second cylinder hole 18. Consequently, compared to a structure in which end covers are provided on opposite end surfaces of the cylinder main body 20, the total length of the rotary actuator 10 can be made shorter, and therefore, a smaller scale rotary actuator 10 can be provided.

Further, the first plug 28 is positioned in the first cylinder hole 16 without projecting outside of the first cylinder hole 16, and the second plug 30 is positioned in the second cylinder hole 18 without projecting outside of the second cylinder hole 18. Therefore, the rotary actuator 10 can be made even smaller in scale.

Furthermore, the first plug 28 engages with the cylinder main body 20 by the corner 138 of the outer edge portion of the first plug 28 biting into the wall surface that constitutes the opening on the other end side of the first cylinder hole 16, and the second plug 30 engages with the cylinder main body 20 by the corner 140 of the outer edge portion of the second plug 30 biting into the wall surface that constitutes the opening on the other end side of the second cylinder hole 18.

In accordance with this structure, the first plug 28 and the second plug 30 can be fixed reliably with respect to the cylinder main body 20, with no need to use fastening members such as bolts or the like. Further, since a seal member such as a gasket or the like is unnecessary, the number of parts can effectively be reduced.

According to the present embodiment, the first front communication recess 112, which communicates with the first port 108 and faces the opening on the one end side of the first cylinder hole 16, the second rear communication recess 118, which communicates with the opening on the one end side of the second through hole 96, and the connecting passage 120, which communicates with the first front communication recess 112 and the second rear communication recess 118, are formed in the end cover 26. Thus, with a simple configuration, the first port 108 can be made to communicate with the first front cylinder chamber 32 and the second rear cylinder chamber 38.

Further, the second front communication recess 116, which communicates with the second port 110 and faces the opening on the one end side of the second cylinder hole 18, the first rear communication recess 114, which communicates with the opening on the one end side of the first through hole 92, and the connecting recess 122, which communicates with the second front communication recess 116 and the first rear communication recess 114, are formed in the end cover 26. Thus, with a simple configuration, the second port 110 can be made to communicate with the second front cylinder chamber 36 and the first rear cylinder chamber 34.

According to the present embodiment, the connecting passage 120 is formed in the interior of the end cover 26, and the connecting recess 122 is formed on the rear surface of the end cover 26. Therefore, with a simple configuration, the connecting passage 120 and the connecting recess 122 can be formed in the end cover 26 without interfering with one another.

Further, the gasket 124, which is formed integrally along the contour of the first port 108, the second port 110, the first front communication recess 112, the first rear communication recess 114, the second front communication recess 116, the second rear communication recess 118, and the connecting recess 122, is interposed between the cylinder main body 20 and the end cover 26. Therefore, a seal can reliably be provided between the cylinder main body 20 and the end cover 26.

The present embodiment is not limited to the structure described above. For example, a portion of the first plug 28 may be formed to project outside of the first cylinder hole 16. The second plug 30 may also be formed in a similar manner.

The rotary actuator according to the present invention is not limited to the above embodiment, and various other structures may be adopted as a matter of course without deviating from the scope of the invention as defined by the appended claims.

What is claimed is:

1. A rotary actuator comprising:
   a cylinder main body through which a first cylinder hole and a second cylinder hole that extend mutually in parallel are formed to penetrate;
   a first piston arranged displaceably in the first cylinder hole along an axial direction of the first cylinder hole and on which a first rack is provided;
   a second piston arranged displaceably in the second cylinder hole along an axial direction of the second cylinder hole and on which a second rack is provided;
   a rotary shaft on which there is provided a pinion that meshes with the first rack and the second rack;
   the rotary actuator further comprising:
   an end cover which, in a state of being disposed on one end surface of the cylinder main body, forms a first cylinder chamber between the end cover and the first piston by closing an opening on one end side of the first cylinder hole, and forms a second cylinder chamber between the end cover and the second piston by closing an opening on one end side of the second cylinder hole;

a first plug engaged with a wall surface that constitutes an opening on another end side of the first cylinder hole, and forming a third cylinder chamber between the first plug and the first piston; and a second plug engaged with a wall surface that constitutes an opening on another end side of the second cylinder hole, and forming a fourth cylinder chamber between the second plug and the second piston;

wherein, in the cylinder main body, there are formed:

a first communication passage that communicates with the third cylinder chamber; and a second communication passage that communicates with the fourth cylinder chamber;

wherein, in the end cover, there are formed:

a first port, which communicates with the first cylinder chamber and the second communication passage, and through which a working fluid flows; and a second port, which communicates with the second cylinder chamber and the first communication passage, and through which the working fluid flows, wherein in the end cover, there are formed:

a first communication recess that communicates with the first port and is arranged face-to-face with the opening on the one end side of the first cylinder hole;

a second communication recess that communicates with the second port and is arranged face-to-face with the opening on the one end side of the second cylinder hole;

a third communication recess arranged face-to-face with an opening of the first communication passage that opens on the one end surface of the cylinder main body;

a fourth communication recess arranged face-to-face with an opening of the second communication passage that opens on the one end surface of the cylinder main body;

a first connecting passage that communicates with the first communication recess and the fourth communication recess; and a second connecting passage that communicates with the second communication recess and the third communication recess, wherein the second connecting passage, the second communication recess, and the third communication recess are connected with one another to form one recess portion that is formed on an outer surface of the end cover that faces the cylinder main body, the first connecting passage is formed in an interior of the end cover, straddling the second connecting passage, the first communication passage extends along the first cylinder hole, and the second communication passage extends along the second cylinder hole.

2. The rotary actuator according to claim 1, wherein:

the first plug is positioned in the first cylinder hole without projecting outside of the first cylinder hole; and the second plug is positioned in the second cylinder hole without projecting outside of the second cylinder hole.

3. The rotary actuator according to claim 1, wherein:

the first plug is engaged by an outer edge portion of the first plug biting into the wall surface that constitutes the opening on the other end side of the first cylinder hole; and the second plug is engaged by an outer edge portion of the second plug biting into the wall surface that constitutes the opening on the other end side of the second cylinder hole.

4. The rotary actuator according to claim 1, wherein a gasket, which is formed integrally along a contour of the first port, the second port, the first communication recess, the second communication recess, the third communication recess, the fourth communication recess, and the second connecting passage, is interposed between the end cover and the cylinder main body.

* * * * *